United States Patent [19]

Malherbe

[11] Patent Number: 4,629,041
[45] Date of Patent: Dec. 16, 1986

[54] ELECTRONMAGNETICALLY OPERATED FREE-WHEEL CONTROL DEVICE RESPONSIVE TO A BRAKE CONTROL AND TO A HIGH SPEED DETECTING MEANS TO PROVIDE A FREE-WHEEL OVERRIDE FUNCTION

[76] Inventor: André15 rue de Gastines Malherbe, Cedex 628, F-41500 Suevres, France

[21] Appl. No.: 596,466
[22] PCT Filed: Feb. 4, 1983
[86] PCT No.: PCT/FR83/00024
  § 371 Date: May 14, 1984
  § 102(e) Date: May 14, 1984
[87] PCT Pub. No.: WO83/02985
  PCT Pub. Date: Sep. 1, 1983

[30] Foreign Application Priority Data

Feb. 23, 1982 [FR] France ................................ 82 02940

[51] Int. Cl.[4] ............................................. B60K 41/20
[52] U.S. Cl. ........................................ 192/2; 192/4 C;
   188/180; 188/72.3
[58] Field of Search ............... 192/4 A, 2, 4 C, 12 B,
   192/12 D, 13 R, 83, 63, 45, 103 B, 104 C, 47,
   38, 27, 3.55; 188/69, 71.1, 72.3, 157, 180

[56] References Cited

U.S. PATENT DOCUMENTS

| | | | |
|---|---|---|---|
| 1,983,250 | 12/1934 | Tibbetts . | |
| 2,012,087 | 8/1935 | Nardone | 192/48.7 |
| 2,144,160 | 1/1939 | Kolb et al. . | |
| 2,283,965 | 5/1942 | Brancolino | 192/47 |
| 3,188,435 | 6/1965 | Rugsten | 29/622 X |
| 3,949,848 | 4/1976 | Fogelberger . | |
| 4,111,288 | 9/1978 | Fogelberg . | |
| 4,187,935 | 2/1980 | O'Hern | 192/4 A |
| 4,456,108 | 6/1984 | Kageyama | 192/4 A |

FOREIGN PATENT DOCUMENTS

| | | |
|---|---|---|
| 576907 | 5/1933 | Fed. Rep. of Germany . |
| 1157423 | 12/1957 | France . |
| 2428179 | 1/1980 | France . |
| 397585 | 2/1966 | Switzerland . |

Primary Examiner—George H. Krizmanich
Attorney, Agent, or Firm—Ostrolenk, Faber, Gerb & Soffen

[57] ABSTRACT

A transmission with free-wheel capability comprises a bolt slidingly mounted in a bell-housing integral with a driving shaft, adapted for engagement in a cage provided with rollers and mounted in the bell-housing for movement between two positions in which the rollers and the bell-housing are in abutment so that a driving and a driven shaft are coupled to rotate together. The bolt maintains the cage in a middle position in which the driven shaft is disengaged and allowed to free-wheel, when the transmission is in forward travel and not in any braking condition. An electromagnet draws the bolt into the cage. This device ensures the free-wheel setting of the vehicle in forward travel up to a predetermined speed. At higher speeds a safety system automatically couples the driving and driven shafts together again.

11 Claims, 6 Drawing Figures

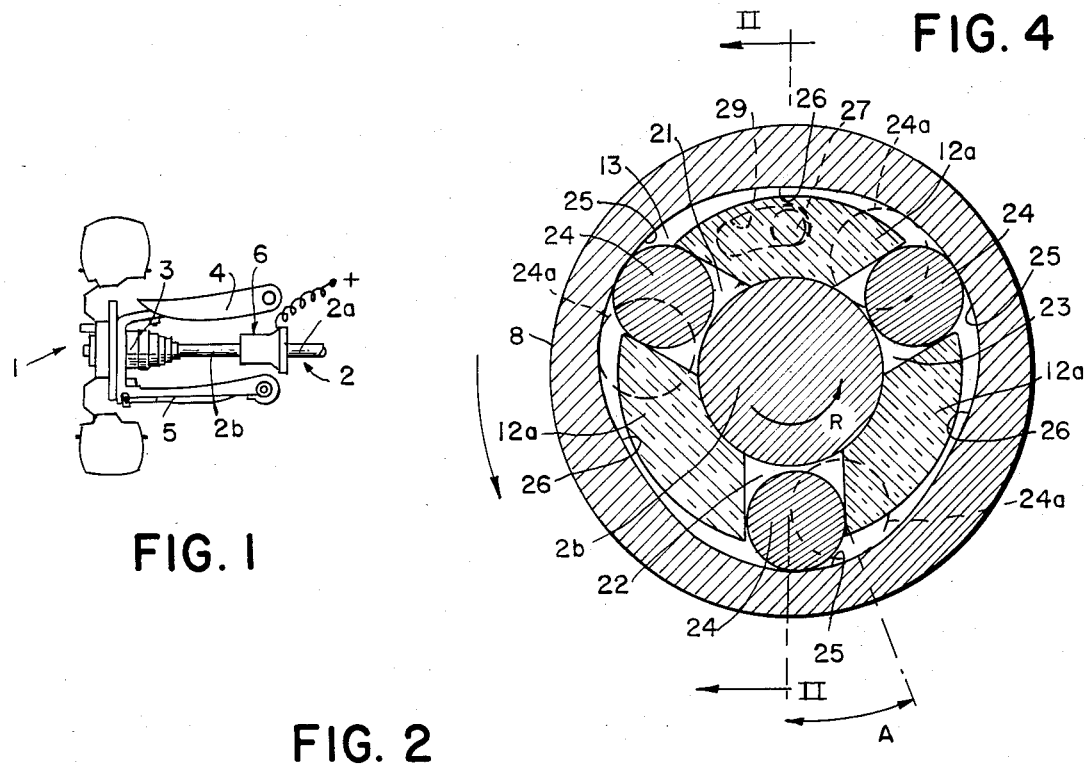
FIG. 1
FIG. 4
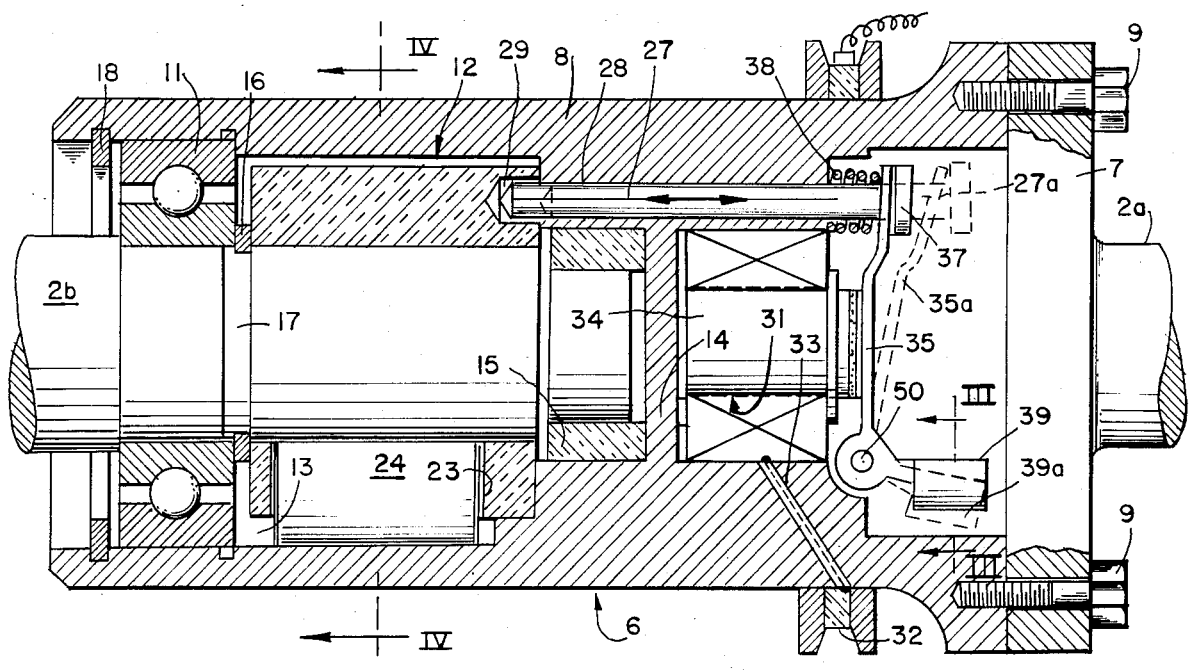
FIG. 2
FIG. 3

ELECTRONMAGNETICALLY OPERATED FREE-WHEEL CONTROL DEVICE RESPONSIVE TO A BRAKE CONTROL AND TO A HIGH SPEED DETECTING MEANS TO PROVIDE A FREE-WHEEL OVERRIDE FUNCTION

BACKGROUND OF THE INVENTION

1. Field of the Invention

The present invention relates to a control device for a safety free-wheel coupling, adapted to be mounted on a motor vehicle transmission shaft.

Numerous free-wheel coupling devices have already been proposed, either for machine-tools or for motor vehicles.

Thus, French Pat. No. 1 157 423 (RENAULT) describes a free-wheel coupling system which cannot be engaged at all speeds, and whose engagement is solely manual and not automatic. This device, provided normally for a machine-tool, is too cumbersome to be mounted on an unequipped transmission shaft and cannot therefore be adapted to the transmission shaft of a motor vehicle. This remains why it is in fact unused.

U.S. Pat. No. 3,188,435 relates to a free-wheel system, which is only engaged from a certain speed and which is therefore dangerous. Moreover, no safety means are provided in this device.

U.S. Pat. No. 2,012,087 relates to a device for coupling two shafts together for machine-tools, allowing uncoupling in only one direction. This extremely cumbersome device cannot be adapted to a motor vehicle shaft.

U.S. Pat. No. 2,283,965 relates to a system for coupling two shafts together which can only provide this coupling in a single direction of rotation.

Now, in a free-wheel coupling for motor vehicles, it is indispensable to have the ability to couple in both directions of rotation.

The object of the invention is to provide a free-wheel coupling control device for motor vehicles which is relatively simple in construction, compact and consequently easy to mount on an unequipped transmission shaft, and very reliable in operation. In particular, the aim of the invention is to provide a conrol device which allows the wheel of the vehicle to be recoupled automatically to the associated transmission shaft from a certain forward speed, and this for obvious safety reasons. The invention also aims to allow the automatic re-establishment of the engine brake at the same time as the recoupling of the two shafts during braking, without any action being required of the user.

The advantage of the free-wheel couplings provided by the invention consists essentially in the substantial saving in fuel offered by low speed devices, mainly in urban areas, because of the recovery of the inertia of the vehicle.

However, because the friction between the wheels of the vehicle and the ground is considerably reduced when the wheels are uncoupled from thair drive shaft, it will be readily understood that the safety of the driver requires instantaneous recoupling of the wheel and the transmission shaft in certain predetermined speed ranges and in the case of braking, while ensuring recovery of the energy lost during engine brake.

The control device provided by the invention is adapted to be mounted on a motor vehicle transmission shaft between a first driving part of this shaft and a second driven part of said shaft driving a wheel, and it comprises means for coupling the driving shaft and the driven shaft together in both directions of rotation thereof and for uncoupling the driving shaft from the driven shaft in the direction of rotation corresponding to forward travel.

SUMMARY OF THE INVENTION

According to the invention, the free-wheel coupling control device comprises:

a bolt slidingly mounted in a bell-housing integral with the driving shaft, adapted to engage in a cage housed inside the bell-housing and to oscillate therein between two endmost positions in which it is in abutment against bosses of the bell-housing and interlocks the driven shaft and the driving shaft together for rotation in both directions. Means are provided for automatically introducing the bolt into the cage when the vehicle is in forward travel and for maintaining this bolt in a middle position between the two above-mentioned endmost positions when the driver is not accelerating and is not braking, so that the driven shaft is then uncoupled from the driving shaft and is then free-wheeling, A safety system adapted to automatically retract the bolt from the oscillating cage from a predetermined speed in forward travel, during braking and rearward travel, which recouples together the driving and driven shafts is also provided.

According to one feature of the invention, the cage has a hole for receiving the sliding bolt, arranged so that when this bolt is engaged in the hole and when the driving shaft rotates slower than the driven shaft, with the vehicle in forward travel, said bolt secures the cage against rotation as well as rollers embedded therein, while maintaining these latter in hollow angular sectors formed in the cage, so that the driven shaft is uncoupled from the driving shaft and the associated wheel is free.

Because of the faster rotation of the driven shaft integral with the wheel, caused by the inertia of the vehicle for example when going downhill or when the accelerator is released, uncoupling of the two shafts occurring automatically for the driven shaft causes rotation of the cage and the rollers, but this rotation is limited by the bolt which comes into abutment against one end of an appropriate oblong hole provided in the cage.

BRIEF DESCRIPTION OF THE DRAWINGS

Other features and advantages of the invention will be apparent from the following description, made with reference to the accompanying drawings in which a non limiting embodiment of the invention has been shown.

FIG. 1 is a schematic elevation view of a vehicle wheel and of its drive shaft provided with a free-wheel coupling control device in accordance with the invention.

FIG. 2 is a view in axial longitudinal section along II—II of FIG. 4 of one embodiment of the coupling control device of the invention.

FIG. 3 is a cross sectional view of a detail through III—III of FIG. 2.

FIG. 4 is a cross sectional view of the device through IV—IV of FIG. 2.

DESCRIPTION OF THE PREFERRED EMBODIMENTS

Figure 6:
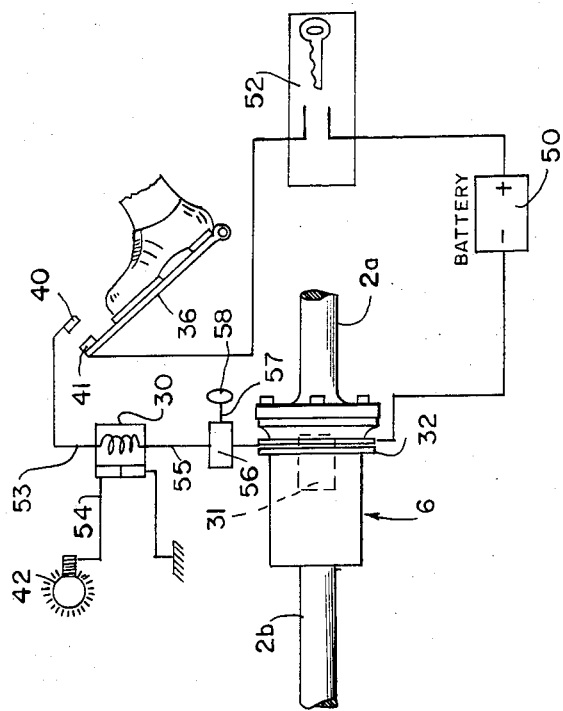
FIG. 6 is a schematic elevational view illustrating the control of the coupling device by means of the brake pedal of the vehicle.
Figure 5:
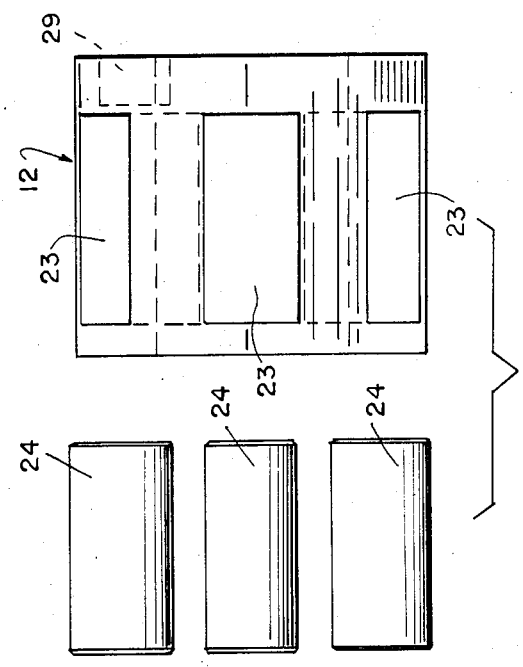
FIG. 5 is a side view in elevation of the oscillating cage forming part of the device of FIGS. 2 to 4, and of the rollers embedded in this case.

In FIG. 1 shown a motor vehicle wheel 1, and its transmission shaft 2 provided with a universal joint 3, wheel 1 being equipped with two suspension arms 4,5.

Drive shaft 2 is provided with a free-wheel coupling devise 6 for uncoupling the driving part 2a of shaft 2 from the driven part 2b, and this only when the vehicle is in forward travel for safety reasons.

The coupling device 6 and its control system will be described with reference to FIGS. 2 to 6.

The end of the driving shaft 2a is embedded in a plate 7 and fixed thereto by welding. Plate 7 is firmly secured to a cylindrical bell-housing 8 by means of several bolts 9, the driven shaft 2b having its end engaged axially in the bell-housing 8. In the housing 8 is mounted, on the side opposite the driving shaft 2a, a ball-bearing 11 for centering the driven shaft 2b, as well as a cage 12 mounted in an inner space 13 of the bell-housing 8. The driven shaft 2b passes axially through the cage 12 beyond which its end comes into abutment against a transverse dividing wall 14. Between cage 12 and the dividing wall 14, the end of the driven shaft is centered in a ring 15. A circlip 16 fitting into an annular groove 17 of shaft 2b is inserted between cage 12 and bearing 11, whereas a circlip 18 engaged in the end of the bell-housing 8 holds bearing 11 in place.

Cage 12, having a circular contour, is mounted with clearance inside inner space 13 as can be seen in FIGS. 2 and 4.

This cage comprises three longitudinal recesses 21, 22,23 whose axes, are parallel to the axes of shafts 2a and 2b, and are equidlstantly spaced by 120°. In each recess 21, 22 and 23 is disposed a roller 24, whereas the wall sections 12a extending between two consecutive rollers 24 have inner edges whose radius of curvature is equal to that of the driven shaft 2b on which cage 12 is thus engaged.

Moreover, the inner wall of inner space 13 has a cam shaped surface so as to have three equidistant hollows 25 and three equidistant bosses 26 sandwiched between the hollows 25 and having a radius of curvature substantially greater than these latter. The three hollows 25 extend over a half circumference like the three bosses 26, the entire structure forming a cam surface on which rollers 24 and cage 12 may oscillate with sufficient amount of mechanical play. In fact, the assembly formed by cage 12 and its bearing rollers 24 may thus assume two endmost angular positions as follows:

(a) a first position shown in solid lines in FIG. 4, in which the rollers 24 are in the hollows 25 and the sections 12a are opposite bosses 26, but with play between these latter and the sectors 12a. Thus, it will be readily understood that the driven shaft 2b is uncoupled in rotation from bell-housing 8 and consequently from the driving shaft 2a, the corresponding wheel 1 being thereofore free.

(b) a second angular position indicated by the rollers shown with broken lines 24a (FIG. 4), spaced from the preceding position by an angular sector of about 12 to 15 degrees, in which the rollers 24a as well as the sandwiched sectors 12a come into abutment against the bosses or cams 26. Cage 12 and rollers 24 may come into this abutment position against bell-housing 8 in one direction of rotation or in the other from the full line position shown in FIG. 4, a single one of these endmost positions having been shown (rollers 24a).

In one or other of these two positions symmetrical with respect to the position of rollers 24, cage 12 is applied both against the driven shaft 2b and against the bell-housing 8, so that the coupling for rotation of shafts 2a and 2b is then achieved in one or other of the two directions of rotation.

In accordance with the invention, the coupling device comprises a bolt 27 formed by a rod capable of sliding inside the bell-housing 8, parallel to the axis thereof and shafts 2a,2b, in a housing 28 provided in cage 12 and shaft 2a. The endmost part of bolt 27 may engage in an oblong hole 29, substantially in the shape of a bean, formed in cage 12 between two recesses 21 (FIG. 4). The hole 29 extends over an angular sector corresponding to the angular movement A of cage 12 and rollers 24 between the "free-wheel" position shown with broken lines in FIG. 4 and the recoupling position for rotation of the driving 2a and driven 2b shafts in forward travel, shown by the broken line rollers 24a. Bolt 27 may assume a first position shown with full lines in FIG. 1, in which its end is introduced into the hole 29 of end of the bolt is withdrawn from hole 29, by sliding in housing 28.

The invention provides means for automatically controlling the position of bolt 27, which comprise in the example shown an electromagnet 31 disposed axially in the bell-housing 8 between the dividing wall 14 and plate 7, in a central housing of the bell-housing 8. The electromagnet 31 is connected to a collector ring 32 by electrical connections 33 passing through the bell-housing 8. The collector ring 32 is connected on the one hand to contact 40 (FIG. 6) to which is applied a second contact 41 fixed to the end of the brake pedal 36 and, on the other hand, to a relay 30 connected to the control of a backing light 42. Thus, contacts 40 and 41 are applied one on the other when pedal 36 is raised, i.e. when the driver is not braking and, on the other hand, relay 30 is adapted to cut off automatically the supply to the electromagnet 31 when the vehicle is travelling rearwards.

The electromagnet 31 may be supplied constantly with electric current from the battery 50 of the vehicle by means of the connections shown in FIG. 6, so that once the engine is switched on by switch 52, a current flows permanently through the electromagnet 31 except when the driver presses the brake pedal 36 separating contacts 40 and 41. Also, as noted above, relay 30 is adapted to interrupt the current to electromagnet 31 when the vehicle's transmission is in reverse. Relay 30 operates such that line 53 is connected either to line 54, leading to a backing light 42, when the vehicle is in reverse, or to line 55 when the vehicle is traveling forward.

The control connection between the core 34 of the electromagnet and bolt 27 is formed by an arm 35 extending opposite core 34 and mounted for pivoting about a pin 50 integral with the bell-housing 8. The end of bolt 27 passes through the endmost part of arm 35 to which it is secured by an end retaining collar 37. When the current flows through the electromagnet 31, the core 34 attracts the metal arm 35 which then pivots about pin 50 and causes the bolt 27 to slide until the bolt 27 engages in the oblong hole 29. Conversely, when no current is flowing through the electromagnet 31, a return spring 38 disposed coaxially about bolt 27 bearing against the bell-housing 8, exerts a thrust on the arm 35.

The bolt 27 is retracted outside hole 29 as far as its position 27a, arm 35 pivoting correspondingly to its position 35a. Thus, shafts 2a and 2b may be recoupled automatically together through the return action of spring 38, which thus forms a first safety control.

Beyond the pin 50, arm 35 is extended by a flyweight 39 which tends to move away from its initial position shown with full lines (FIG. 2) under the effect of the centrifugal force during rotation of shaft 2a. The flyweight 39 may thus pivot to its position 39a, while then causing arm 35 to pivot about the pin 50, this pivoting movement causing the bolt 27 to be removed from the oblong hole 29 to its retracted position 27a corresponding to the maximum movement 39a of fly-weight 39.

However, complete extraction of bolt 27 from hole 29 is only achieved at a certain predetermined speed, e.g. 80 km/hour. Since this extraction causes automatic recoupling of the driving 2a and driven shafts from this speed, it forms a second safety control.

The torque for extracting bolt 27 created by rotation of the fly-weight 39 is in the same direction as the return force exerted on bolt 27 by spring 38 to which it is added, but the opposite direction to the force of attraction exerted on arm 35 by the electromagnet 31. Consequently, for extraction of bolt 27 to be effective, the total force produced by movement of the fly-weight 39 and the return force of spring 38 must be greater than the counter force exerted by the electromagnet 31 on arm 35, which may be achieved by appropriate adjustment of these different elements, for a predetermined speed.

The operation of the coupling which has just been described is as follows:

1. With the vehicle stopped, and the engine switched off, no current flows through the electromagnet 31, so that the return spring 38 holds bolt 27 in the retracted position outside the oblong hole 29 (position 27a). This ensures safety for parking the vehicle which may thus be engaged.

2. When the vehicle is travelling forwards and when the driver is not pressing the brake pedal 36, the electromagnet 31 is supplied with current which causes, as explained above, bolt 27 to be introduced into the oblong hole 29. When the driver accelerates, while still remaining below the above-mentioned predetermined speed (for example 80 km/hour), the driving shaft 2a and the bell-housing 8 rotate first of all in a counterwise direction with respect to the driven shaft 2b, by driving bolt 27. This latter then moves angularly in hole 29 from its position shown with broken lines in FIG. 4, to a second position close to the opposite end of the oblong hole 29. At the end of the relative rotation thus effected between shafts 2a and 2b, cage 12 and rollers 24 are engaged with bell-housing 8 in their endmost position opposite position 24a, and thus ensure automatic coupling between the driven shaft 2b and the driving shaft 2a as explained above. At low speed, the action of the inertia fly-weight 39 is insufficient to cause retraction of bolt 27.

When the driver releases his pressure on the accelerator without howver baking, the driving shaft 2a rotates more slowly than the driven shaft 2b (which rotates in the direction of the arrow R). Thus, bolt 27 travels along hole 29 in the opposite direction and comes back to its initial position shown with broken lines in FIG. 4, in which it holds the rollers 24 and cage 12 in the intermediate position between the two endmost coupling positions. In this intermediate position, shafts 2a and 2b are uncoupled as was explained above and the corresponding wheel is therefore free.

3. When the driver presses the brake pedal 36, contact 41 moves away from contact 40 and the electromagnet 31 is no longer supplied with power so that the spring 38 automatically pulls bolt 27 back outside hole 29 into its retracted position 27a. Thus, shafts 2a, 2b are coupled together again and the engine brake is furthermore re-established.

4. When the speed exceeds the predetermined safety speed, the action of the fly-weight 39 becomes preponderant and ensures extraction of the bolt 27 from cage 12 and consequently the automatic coupling together again of the two shafts 2a, 2b. When the speed again decreases below the predetermined safety speed, and when the driver is not braking, the device automatically re-establishes the free-wheel setting by reintroducing bolt 27 into hole 29.

5. When the vehicle is traveling backwards, the relay 30 coupled to the reversing light 40 automatically cuts off the power supply to the electromagnet 31, so that bolt 27 is retracted out of the cage 12 by the return spring 38. Shafts 2a and 2b are therefore coupled together again.

Moreover, for the safety of the driver, the features of the device are determined so that bolt 27 may be retracted beyond the predetermined safety speed, even if the electromagent 31 remained abnormally supplied with current, because of the action of the inertial fly-weight 39.

The control device of the invention is particularly easy to fit to an unequipped transmission shaft. For that it is sufficient to cut the shaft and to install the coupling between the driving 2a and driven 2b parts, the driving shaft being welded to the bell-housing 8. Fitting of this device to a vehicle requires then no transformation of the essential parts thereof.

Moreover, the different parts provided by the invention for automatically retracting bolt 27 from cage 12 so as to allow automatic recoupling of shafts 2a and 2b guarantee the safety of the driver in the different situations likely to arise: overshooting the predetermined speed in forward travel, braking in forward travel, reversing.

It will also be noted that, if there occurs an accidental current cut in the circuit of the electromagnet 31, spring 38 automatically retracts bolt 27, which further increases the safety of the control device.

This device has the advantage of being adaptable to any existing vehicle, as well as allowing gear-changing without declutching when the vehicle is travelling in the speed range where the free-wheel is acting because of permanent existing declutching.

Bolt 27 is arranged so as not to present any resistance to sliding in bell-housing 8.

The invention is not limited to the embodiment described and may comprise different variants. Thus, the electromagnet 31 could be placed outside the bell-housing 8, but it would then be necessary to provide means for compensating the unbalance of the device due to the presence of the weight of this fly-weight. As a variant, this unbalance device could be replaced by a direct electric control of the electromagnet, by means of a contact opened directly as a function of the speed of the vehicle in a programmed way or not. Finally, relay 30 may be replaced by an appropriate transistorized contact and an electronic contact 56 may be provided in the speedometer cable 57 of speedometer 58 of the vehicle to provide current cut-off when the vehicle is stopped.

What is claimed is:

1. A free-wheel control device for coupling a driven shaft and a driving shaft of a transmission for a vehicle having brake means for braking the vehicle and means for accelerating the vehicle, said control device comprising:

means for coupling the driving shaft to the driven shaft to drive the driven shaft in both a forward rotational direction and a backward rotational direction;

means, coupled to the brake means and to the acceleration means and responsive thereto, for uncoupling the driven and driving shafts from one another to permit free-wheeling of the driven shaft during a condition of a non-actuation of the brake means or actuation of the acceleration means; and means for overriding the uncoupling means and for recoupling the driven and driving shafts to one another when the driven shaft exceeds a predetermined forward rotational speed or when the brake means are operated or when the driven shaft is driven in the backward rotational direction.

2. The device as claimed in claim 1, wherein the housing includes, between its inner bosses, angular hollow sectors adapted to receive with play rollers engaged in corresponding housings of the cage in which the driven shaft is coaxially mounted so that, when the rollers are in the hollow sectors, a clearance is created between the cage, on the one hand and the housing and the driven shaft on the other, whereby the driven shaft is uncoupled from the driving shaft and when the rollers come into abutment against the bosses in one or the other direction of rotation, the cage comes into abutment against the housing and couples in rotation the driven shaft and the driving shaft together.

3. The device as claimed in claim 2, wherein the cage includes means for receiving the sliding bolt arranged so that when the bolt is engaged by the receiving means and when the driving shaft rotates slower than the driven shaft, with the transmission in forward motion, the bolt locks the cage and the rollers from rotating to keep them in the hollow sectors; the driven shaft being then disengaged and free-wheeling.

4. The device as claimed in one of claims 2 or 3, wherein the bolt is a rod housed inside the housing, and extending parallel to the axis of the driving and driven shafts, so as to be engageable in an oblong hole formed in the oscillating cage, the oblong hole extending over an angular sector corresponding to the angular movement of the cage and the rollers between a free wheel position and the first position for coupling the driving and driven shafts together again in rotation in forward travel, the device further including means for automatically controlling the introduction of the bolt into the oblong hole of the cage when the driving shaft is in forward travel.

5. The device as claimed in claim 4, wherein the automatic control means comprise an electromagnet housed in the housing and connected to an electric contact associated with the brake means which provides electric current to the electromagnet and therefore initiates introduction of the bolt into the oblong hole and holds it there as long as a driver does not press a brake pedal.

6. The device as claimed in claim 5, wherein the recoupling means comprises a fly-weight fixed to a support which is pivotably mounted about a pin mounted to the housing, the support comprising a pivot arm one end of which is firmly secured to the bolt, so as to be able to automatically retract the bolt from the cage when, under the effect of centrifugal force at the predetermined speed, the fly-weight moves away from its initial position while causing the arm to pivot about the pin with a force greater than an opposite force exerted on the bolt by the electromagnet.

7. The device as claimed in claim 1, wherein the recoupling means includes means for automatically disengaging the bolt from the cage when the driven shaft is stopped or when the driven shaft is driven in the backward rotational direction.

8. The device as claimed in claim 5, wherein the recoupling means comprises a relay connected to the control of a reversing light associated with the transmission for automatically cutting off the supply to the electromagnet during reversing of the impression.

9. The device of claim 1 which comprises:

a housing connected to be rotatable by the driving shaft and having an interior surface and circumferentially spaced inner bosses formed on the interior surface;

a cage located in the housing and shaped and mounted to oscillate between first and second endmost positions with respect to the housing at which the cage engages the bosses of the housing to rotate therewith, the driven shaft being located in the cage to rotate coaxilly with the driving shaft and being coupled to the cage to rotate therewith whenever the cage is at one of the endmost positions;

a sliding bolt located in the housing and rotatable therewith; and means for coupling the bolt to the cage to control the position of the cage with respect to the housing such that the bolt retains the cage in a middle position, which permits free-wheeling of the driven shaft, whenever the transmission rotates in the forward direction and the brake means and accelaration means remain non-actuated and the predetermined forward rotational speed is not exceeded.

10. The device as in claim 7 in which the automatic disengaging means comprises a spring.

11. The device as in claim 7 in which the automatic disengaging means comprises an electrical contact mounted on a speedometer cable of a motor vehicle associated with a transmission for supplying current to the electromagnet.

* * * * *

UNITED STATES PATENT AND TRADEMARK OFFICE
CERTIFICATE OF CORRECTION

PATENT NO. : 4,629,041

DATED : December 16, 1986

INVENTOR(S) : Andre Malherbe

It is certified that error appears in the above-identified patent and that said Letters Patent is hereby corrected as shown below:

In the Inventor section, change "Andre15 rue de Gastines Malherbe" to read --Andre Malherbe, 15 rue de Gastines,--.

Signed and Sealed this

Seventeenth Day of March, 1987

Attest:

DONALD J. QUIGG

*Attesting Officer*    *Commissioner of Patents and Trademarks*